UNITED STATES PATENT OFFICE.

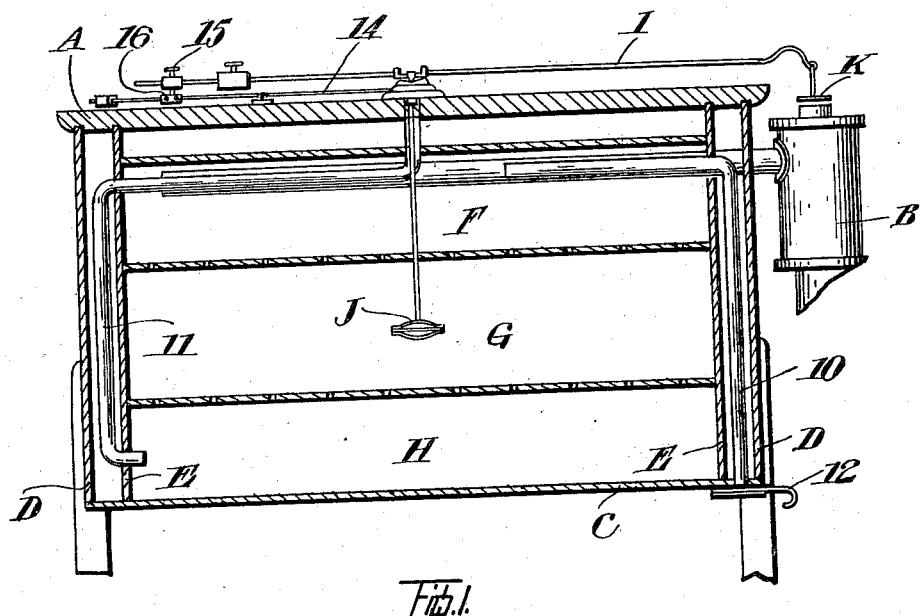
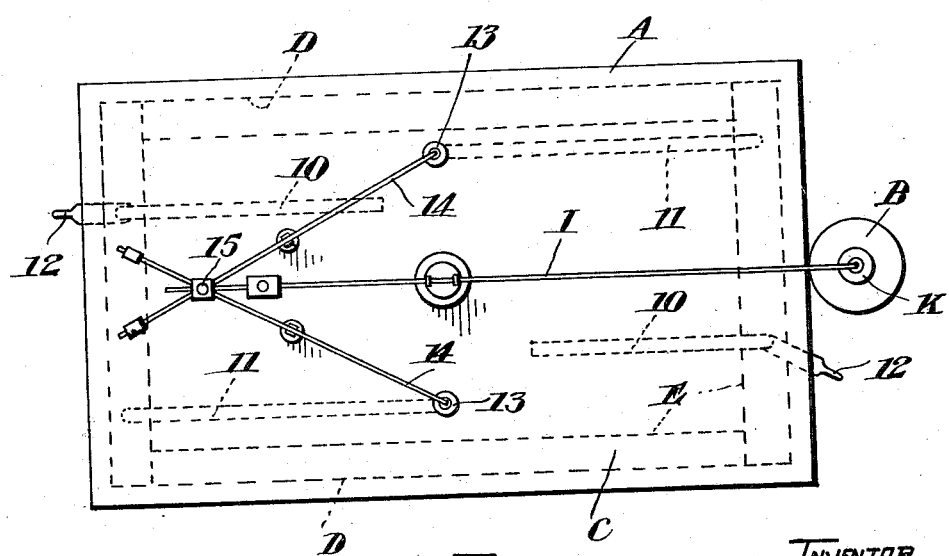

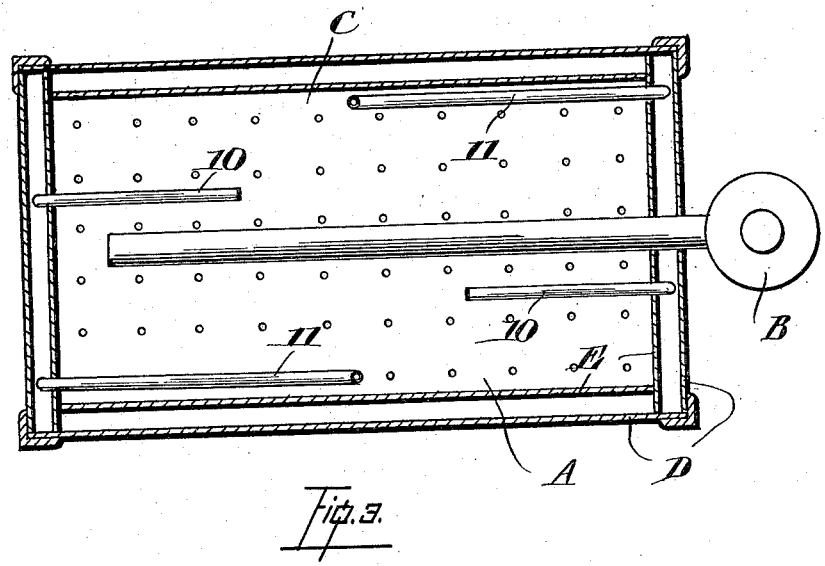
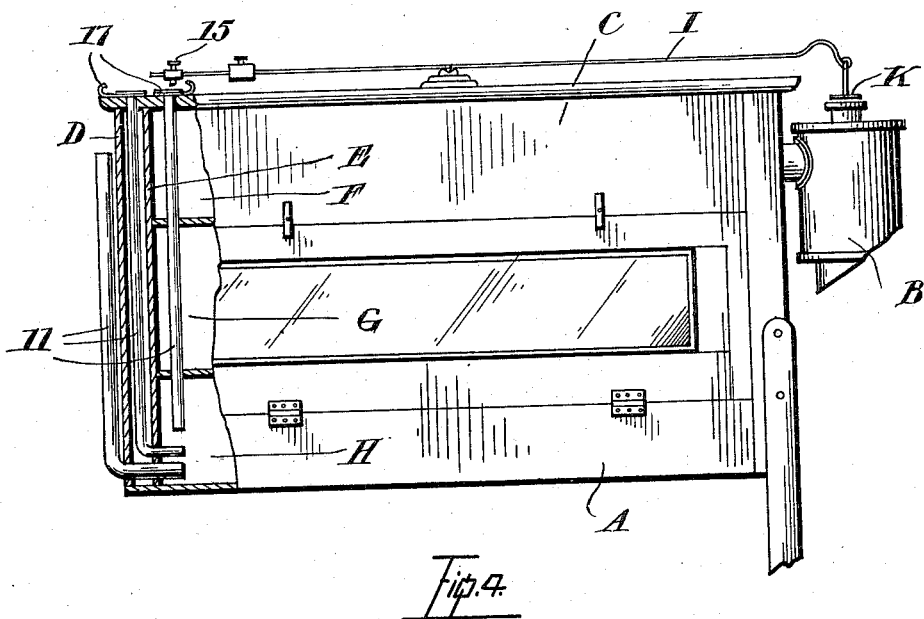

RICHARD CRAIG HAMILTON, OF INVERNESS, NOVA SCOTIA, CANADA.

INCUBATOR.

1,225,953.  Specification of Letters Patent.  Patented May 15, 1917.

Application filed August 30, 1915.   Serial No. 48,135.

*To all whom it may concern:*

Be it known that I, RICHARD CRAIG HAMILTON, a subject of the King of Great Britain, and resident of Inverness, in the Province of Nova Scotia, Dominion of Canada, have invented certain new and useful Improvements in Incubators, of which the following is the specification.

This invention relates to improvements in incubators and the object of the invention is to provide an adequate supply of fresh air of the proper temperature to the egg chamber, and by inducing circulation insure a more even temperature above and below the eggs when the incubator is in operation. Further object is to control the several elements which constitute my ventilation and circulation system so that the heat controlling and regulating elements of incubators as generally adopted may not be interfered with or lessened in value, to the end that incubators may better perform the functions required of them.

With these objects in view the invention consists essentially of the improved construction particularly described and set forth in the following specification and accompanying drawings forming part of the same.

In the drawings:

Figure 1 is a longitudinal sectional elevation of an incubator showing the location of one set of ventilation and circulation pipes and the controlling mechanism coacting therewith.

Fig. 2 is a plan view of the same showing two sets of ventilation and circulation pipes and the controlling mechanism.

Fig. 3 is a sectional plan view of the improved incubator also showing two sets of pipes.

Fig. 4 is a front elevation, partly sectional, of an incubator embodying an alternative form of my invention with reference to the discharge of the ventilation pipe.

Like characters of reference refer to like parts in the several figures.

Referring to the drawings, A represents an incubator of any usual type, comprising a body C incased in double walls D and E, and provided with an upper heat chamber F, a central egg chamber G, and a lower nursery H, the whole being effectively heated by the apparatus B, which is effectively controlled by a regulating system consisting of the lever I pivotally mounted intermediate of its length and operatively connected with the thermostatic element J housed in the egg chamber G, the several parts enumerated being of so well known construction in the art it is deemed unnecessary to further enlarge upon the same.

It is desirable that fresh air of the predetermined temperature should be regularly supplied to the egg chamber G of the incubator when in service, and that a free circulation of the air should be kept up inside the machine to secure more equable temperature, and to this end I provide a set of fresh air and ventilation pipes, 10 and 11 respectively, which I locate partially between the double walls D and E, thereby economizing in space and rendering the complete incubator compact in construction.

The fresh air pipe 10 extends from the bottom of the body C up between the double walls D and E and is offset intermediate of its length, projecting about one third way through the heat chamber F thus insuring the proper heating of the air before it is circulated to the egg chamber.

The ventilation pipe 11 is located partially between double walls D and E and is provided with offset ends projecting slightly into the nursery H and half way through the heat chamber respectively, the discharge end of the said pipe being upturned and extending through the top of the body C permitting the air discharged to pass into the atmosphere.

The opening to the fresh air pipe 10 is controlled by a manually operated damper 12 slidably mounted over the inlet end thereof.

Superimposed on the discharge end of the ventilation pipe 11 and coacting therewith is a damper 13 operatively connected to one end of the lever 14 fulcrumed intermediate of its length to the top of the incubator A, the other end of said lever passing directly underneath a thumb screw 15 threaded in lever I of the heat regulator. By means of the screw 15 the lever 14 is made operatively connected and co-active with the lever I.

When two sets of fresh air and ventilation pipes 10 and 11 are installed two levers 14 are utilized and are designed to pass the one under the other at 16 connecting and coacting.

It will be understood that the sets of ventilating pipes may be duplicated to meet the requirements of the incubator and when four ventilation pipes are required, which may be the case in large incubators, they will be located in pairs connected in one discharge through the top of the incubator.

In the alternative form of this device illustrated in Fig. 4 the ventilation pipes 11 pass directly through the top of the incubator A without offsetting into the heat chamber F or they may be wholly located within the incubator body, double wall or pass through the double walls to the outside and offset upward. It may also be found advisable and advantageous to provide the discharge end of ventilation pipe 11 with a manually operated damper 17 slidably mounted thereon, thereby completely controlling the flow of air therethrough, the other elements of the system being substantially the same as described in connection with Figs. 1, 2, and 3.

When the incubator is in operation and the thermostatic element J has been set to operate the lever I at the predetermined degree of temperature required in the egg chamber G, the thumb screw 16 is set to connect with levers 14 so that when the lever I, through the operation of the thermostatic element J opens the damper K of the heat regulating apparatus B, the lever I being coactive with levers 14, will open and control the dampers 13 putting into operation the ventilation and circulation elements above described.

It will be readily understood that the actuation of damper 13 may be so controlled by adjusting the thumb screw 15 that the temperature of the egg chamber cannot be endangered.

From this it will be seen that I have invented a ventilation and circulation system particularly applicable to incubators, which provides for an adequate supply of fresh air being provided for the egg chamber, and a circulation system which insures a more uniform heat in all parts of the machine. I have also applied a system of control which insures no interference with the established heat regulation as applied to incubators generally.

As many changes could be made in the above construction and many apparently widely different embodiments of my invention, within the scope of the claim, constructed without departing from the spirit or scope thereof, it is intended that all matter contained in the accompanying specification and drawing shall be interpreted as illustrative and not in a limiting sense.

What I claim as my invention is:

In an incubator, a nursery chamber, an egg chamber thereupon, a heat chamber superposed upon the egg chamber, an air inlet pipe terminating in the heat chamber, means for heating the air in said pipe, ventilation means comprising air outlet pipes extending from the lower part of the nursery upwardly, then inwardly and through the upper part of the heat chamber to the atmosphere, dampers for the exhaust ends and an automatic control for simultaneously operating the heating means and the ventilation means.

In witness whereof I have hereunto set my hand in the presence of two witnesses.

RICHARD CRAIG HAMILTON.

Witnesses:
 JOHN EDWARD MAC KEEN,
 LAUCHLIN GORDON MACDOUGALL.

Copies of this patent may be obtained for five cents each, by addressing the "Commissioner of Patents, Washington, D. C."